(No Model.)
T. FITZGERALD, Jr.
Coffee and Tea Filter.
No. 234,556.                    Patented Nov. 16, 1880.
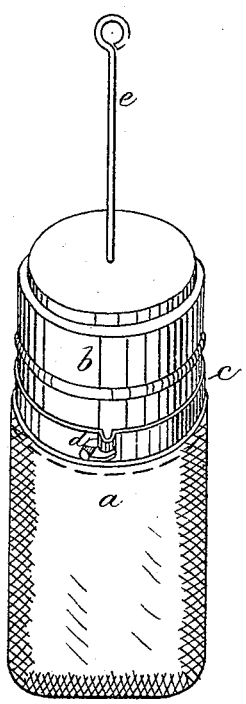
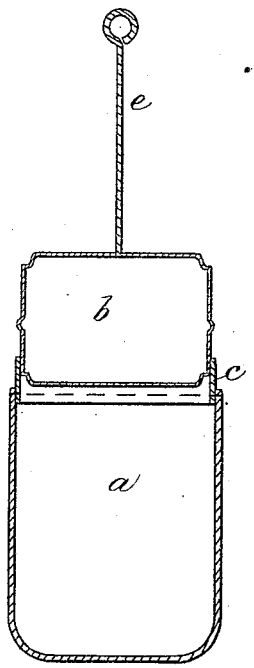
Witnesses,
W. J. Cambridge
John A. Carr.
Inventor,
Thos. Fitzgerald Jr.
by J. H. Adams
Atty.

UNITED STATES PATENT OFFICE.

THOMAS FITZGERALD, JR., OF BOSTON, MASSACHUSETTS.

COFFEE AND TEA FILTER.

SPECIFICATION forming part of Letters Patent No. 234,556, dated November 16, 1880.

Application filed March 31, 1880. (No model.)

*To all whom it may concern:*

Be it known that I, THOMAS FITZGERALD, Jr., of Boston, in the county of Suffolk and State of Massachusetts, have invented a new and useful Improvement in Coffee and Tea Filters, of which the following is a specification.

The object of my invention is to produce a filter for coffee or tea which shall remain suspended in the water contained in the pot or vessel in which the coffee or tea is made, and which may be readily removed from the pot or vessel without the necessity of dipping below the surface of the water to take out the filter.

The invention consists in the combination of a filter composed of muslin, cloth, or other pervious flexible material with an air-tight float of metal provided with a stem or handle on the upper end, the filter being attached to a band, which may be secured to the float in such a manner as to render it easily removable for the insertion or discharge of the coffee or tea to be placed therein.

Referring to the drawings, Figure 1 is a perspective view of a filter embodying my invention. Fig. 2 is a vertical section of the same.

$a$ represents a bag, made of muslin or cloth or other pervious flexible material, in which the coffee or tea is to be placed. The bag $a$ is secured to a narrow metal band, $c$, which latter is attached to a float, $b$, by means of bayonet-joints $d$, or in any other convenient manner to admit of the band to which the bag $a$ is secured being readily attached or detached.

The float $b$ consists of an air-tight vessel or box, made of thin sheet metal or other suitable material, provided with a stem, $e$, projecting from the center of the upper end, to serve as a handle to raise the filter from the pot or vessel when necessary, or it may be made in the form of a bail attached to the edge of the float on each side. The rigid stem or handle $e$ is designed, further, to keep the bag containing the coffee immersed in the boiling water, the said handle or stem being pressed downward by the cover of the vessel, and when the cover is opened the stem will immediately rise and admit of the filter being readily lifted out of the vessel.

I am aware that a float in connection with a strainer is not new. This I do not claim; but What I do claim as my invention is—

The combination, with a float, $b$, and a pervious flexible bag, $a$, connected to the said float by a detachable band, of a rigid stem, $e$, as and for the purpose specified.

In testimony whereof I have signed my name to this specification in the presence of two subscribing witnesses.

THOMAS FITZGERALD, JR.

Witnesses:
JOS. H. ADAMS,
JOHN A. CARR.